United States Patent
Howard et al.

(10) Patent No.: US 9,624,449 B2
(45) Date of Patent: *Apr. 18, 2017

(54) BIOREFINERY PROCESS FOR EXTRACTION, SEPARATION AND RECOVERY OF FERMENTABLE SACCHARIDES, OTHER USEFUL COMPOUNDS, AND YIELD OF IMPROVED LIGNOCELLULOSIC MATERIAL FROM PLANT BIOMASS

(71) Applicant: Applied Biorefinery Sciences LLC, Syracuse, NY (US)

(72) Inventors: Joel R Howard, Syracuse, NY (US); Thomas E Amidon, Jamesville, NY (US); Christopher D Wood, Syracuse, NY (US)

(73) Assignee: Applied Biorefinery Sciences LLC., Syracuse, NY (US)

(*) Notice: Subject to any disclaimer, the term of this patent is extended or adjusted under 35 U.S.C. 154(b) by 83 days.

This patent is subject to a terminal disclaimer.

(21) Appl. No.: 14/133,798

(22) Filed: Dec. 19, 2013

(65) Prior Publication Data

US 2014/0162324 A1  Jun. 12, 2014

Related U.S. Application Data

(62) Division of application No. 12/850,662, filed on Aug. 5, 2010, now Pat. No. 8,618,280.

(60) Provisional application No. 61/264,901, filed on Nov. 30, 2009.

(51) Int. Cl.

| | | |
|---|---|---|
| *C10L 5/44* | (2006.01) | |
| *C08H 8/00* | (2010.01) | |
| *C13K 1/02* | (2006.01) | |
| *B27N 3/02* | (2006.01) | |
| *B27N 3/06* | (2006.01) | |
| *C13K 13/00* | (2006.01) | |
| *C08B 37/00* | (2006.01) | |

(52) U.S. Cl.
CPC .............. *C10L 5/44* (2013.01); *B27N 3/02* (2013.01); *B27N 3/06* (2013.01); *C08B 37/0057* (2013.01); *C08H 8/00* (2013.01); *C13K 1/02* (2013.01); *C13K 13/00* (2013.01); *C13K 13/002* (2013.01); *C13K 13/007* (2013.01); *Y02E 50/10* (2013.01); *Y02E 50/16* (2013.01); *Y02E 50/17* (2013.01); *Y02E 50/30* (2013.01)

(58) Field of Classification Search
None
See application file for complete search history.

(56) References Cited

U.S. PATENT DOCUMENTS

| | | | |
|---|---|---|---|
| 6,328,562 B1* | 12/2001 | Sirney et al. | 433/19 |
| 8,317,975 B2* | 11/2012 | Amidon et al. | 162/14 |
| 8,618,280 B2* | 12/2013 | Howard | C08H 8/00 536/123.1 |
| 8,940,133 B2* | 1/2015 | Amidon et al. | 162/72 |
| 2009/0176286 A1* | 7/2009 | O'Connor et al. | 435/139 |
| 2011/0073264 A1* | 3/2011 | Liu | D21C 1/02 162/68 |
| 2011/0300586 A1* | 12/2011 | Liu | C08H 8/00 435/99 |

OTHER PUBLICATIONS

Newman et al., "Carbon-13 NMR evidence for cocrystallization of cellulose as a mechanism for hornification of bleached kraft pulp" Cellulose (2004) vol. 11 pp. 45-52.*
Sattler et al., "Effects of Hot Water Extraction on Physical and Chemical Characteristics of Oriented Strand Board (OSB) Wood Flakes" Clean (2008) vol. 36 No. 8 pp. 674-681.*

* cited by examiner

*Primary Examiner* — Eric Olson
(74) *Attorney, Agent, or Firm* — Bernhard P. Molldrem, Jr.

(57) ABSTRACT

Non-food plant biomass is subjected hot-water extraction in a pressurized vessel at an elevated temperature up to about 250° C. without addition of reagents, to yield an aqueous extract containing hemicellulosic components and a lignocellulosic residue. The process leaves the lignocellulose substantially intact, but with the hemicellulosic content largely removed. The separated aqueous extract or liquor is concentrated and purified, and long-chain sugars are reduced into monomer saccharides. The lignocellulosic residue may be further processed, to yield a useful fibrous material that is highly resistant to sorption of water. This material may be used for composite materials that resist water degradation, or may be used to produce a higher thermal-yield, water-resistant fuel, or may be used as bioconversion feedstock for producing high-value, lignocellulosic derivatives.

7 Claims, 1 Drawing Sheet

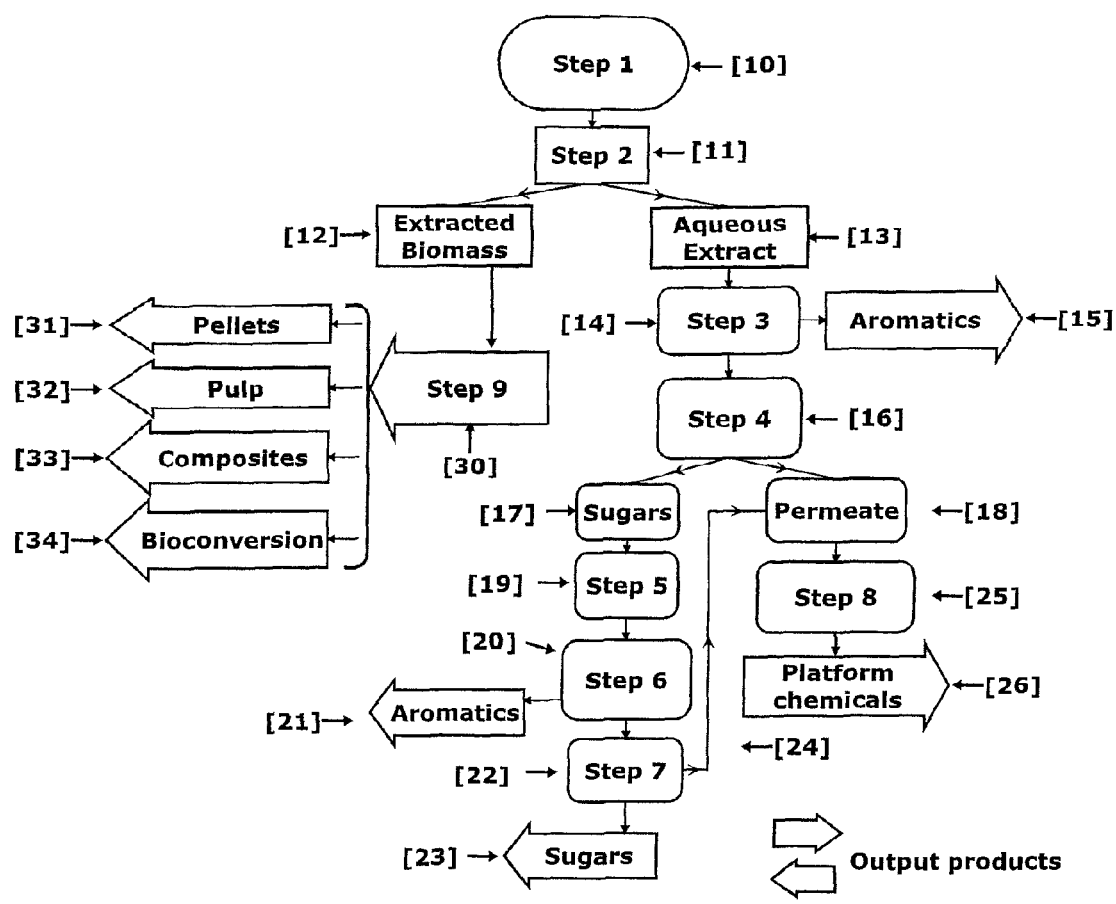

BIOREFINERY PROCESS FOR EXTRACTION, SEPARATION AND RECOVERY OF FERMENTABLE SACCHARIDES, OTHER USEFUL COMPOUNDS, AND YIELD OF IMPROVED LIGNOCELLULOSIC MATERIAL FROM PLANT BIOMASS

This is a Divisional Application of co-pending U.S. patent application Ser. No. 12/850,662, filed Aug. 5, 2010, now U.S. Pat. No. 8,618,280, granted Dec. 31, 2013, and which claims priority of U.S. Provisional Pat. Appln. No. 61/264,901, filed Nov. 20, 2009. The disclosure of the foregoing patent applications is incorporated herein by reference.

FIELD OF THE INVENTION

The biorefinery process described hereafter can be set out concisely as the hot water extraction of non-food plant biomass (lignocellulosic material) for separation and recovery of cellulose, hemicellulose, and associated compounds to be used for, or in the production of, fuels, chemicals, wood products, and other useful plant-based products.

BACKGROUND OF THE INVENTION

The present invention involves a biorefinery process for pressure cooking woody or fibrous biomass (i.e., non-food plant biomass such as wood chips, plant stubble, food processing waste or other sources) in water to yield fermentable saccharides, commercial chemicals, and other useful lignocellulosic derivatives, and also to yield woody or fibrous solids that are significantly improved for manufacture of pulp and paper, fuel pellets, wood composites, bioconversion feedstock products such as crystalline cellulose, fermentable glucose, and other useful products.

A. Yield of Fermentable Saccharides, Chemicals, and Other Lignocellulosic Derivatives Various processes have been proposed for recovery of purified chemical compounds from plant biomass, e.g., wood chips or agricultural residues. Typically these fall into three categories: chemical hydrolysis, enzymatic hydrolysis, or hydrothermal hydrolysis in combination with a chemical and/or enzymatic treatment. The general goal of these processes is depolymerization of cellulose (the structural portion of the biomass) into fermentable sugars and other biomass component chemicals, and/or directly targeting the end-product of ethanol.

Chemical hydrolysis relies on using (primarily) an acidic (i.e., low pH) or (less frequently) an alkaline (i.e., high-pH) solution to break down the structure of the biomass, and/or extract component chemicals from the fibrous or chipped plant material. For example, Lightner Published Application US 2003/0154975 discusses of a method of hydrolyzing biomass, to produce a sugar phase and an aqueous acidic solution phase. The process involves removing sugars from a hydrolysate. The hydrolysate is formed into a phase containing sugars and a phase containing concentrated acid. The separated sugar phase may be subjected to additional processing. Similarly, O'Connor et al. Published Application US 2009/0176286, Foody et al. Published Application US 2009/0023187, Zhang Published Application US 2009/0229599, Torget U.S. Pat. No. 6,228,177, and Tsao et al. U.S. Pat. No. 4,281,063 treat lignocellulosic biomass with an acid solution for varying temperatures and times.

Enzymatic depolymerization systems are generally deployed in conjunction with, or following, hydrothermal fiberization (steam explosion) or physical comminution (grinding) of lignocellulosic biomass. Ahring et al. U.S. Pat. No. 6,555,350, and Ahring et al. Published Application US 2009/0178671 present a process for converting lignocellulosic biomass to ethanol while utilizing only a low volume of clean water. Brink U.S. Pat. No. 5,628,830 enzymatically treats finely ground lignocellulosic biomass to disassemble cellulose into its component glucose sugars for fermentation to ethanol. Noriyuki et al. Japan Publication number 207-074992, and Japan Publication number 2007-074993 utilize a combination of enzymatic and hydrothermal/peroxide-aided treatment for the purpose of saccharifying cellulose. Lynd et al. U.S. Pat. No. 5,258,293 provide an improvement to "Direct Microbial Conversion" combined with "Simultaneous Saccharification and Fermentation" in which a single microbial system produces a cellulose disassembly enzyme, and subsequently also produces ethanol as a fermentation product in a single bioreactor at high volumetric productivity rates.

Hydrothermal only treatments are presented by Schmidt et al. U.S. Pat. No. 6,692,578 wherein corn fiber is heated in water to 110° C. to separate and hydrolyze hemicellulose into monosaccharides. Dahlman Published International Application WO 2009/068525 utilizes wood hydrolysis, subjecting the wood to an aqueous hydrothermal treatment for hydrolyzing and saccharifying the cellulose contained in the biomass, and separating it into fractions for production of polymers and monomers. Lignin is decomposed by enzyme action, and removed.

None of these previously proposed systems specifically address removal of acetic acid or other fermentation inhibitive chemicals from the extractant liquor, and consequently it is not likely that the processes isolate highly fermentable sugars from the lignocellulosic material. Similarly, none of the previously proposed systems separate and recover the wide array of commercially valuable, naturally occurring chemicals contained in lignocellulosic biomass.

B. Yield of Improved Woody and Other Fibrous Solids

Prior systems described heretofore tend to attack the structural component of the woody biomass. Therefore, none of these prior systems recognize the manufacturing benefits available from keeping the fibrous solids largely intact during and after removal of the hemicellulosic and other wood-derived compounds, nor do these prior systems recognize the manufactured product benefits resulting from residual lignocellulosic biomass starting material that, with reduced hydrophilic components, is more chemically reactive, more resistant to absorption or adsorption (generally, sorption) of water, and possesses higher caloric value as measured by BTU content per unit of weight, lower ash content, and higher ash fusion temperature. There appears to be no prior art that manufactures improved products as described herein from woody biomass contacted with water in a pressure vessel at an elevated temperature up to about 250° C.

OBJECTS AND SUMMARY OF THE INVENTION

It is an object of this invention to provide a technique that yields a wide variety of useful products from lignocellulosic biomass, including fermentable sugars and low-hydrophilic solids, while avoiding limitations of the prior art.

It is another object to provide a process in which non-food plant biomass can be readily treated to yield these useful products, while at the same time separating and recovering inhibitive chemicals which diffuse into the liquor from the woody biomass during the extraction process. Since the inhibitory chemicals are themselves valuable in commerce, separation and recovery of these materials increases diversity of the overall output product stream, and thus increases the probability of commercial economic viability, that is, a higher economic efficiency.

According to one aspect of the present invention, useful biochemicals can be coaxed from non-food plant biomass, with a hot-water extraction technique that is carried out by contacting a charge of non-food plant biomass material with water (with or without additional process enhancing compounds or materials), in a pressurized vessel at an elevated temperature up to about 250° C. to yield an aqueous (extract solution) mixture of useful chemicals including long-chain saccharides (sugars), acetic acid, methanol, formic acid, furfural, and water soluble lignin, while leaving the structural (cellulose and non-water-soluble lignin) portion of the lignocellulosic material largely intact for manufacturing improved products such as fuel pellets, wood composites, and cellulose derivatives.

A. Yield of Fermentable Saccharides, Chemicals, and Other Lignocellulosic Derivatives Hot water extraction creates a mixture of chemicals and materials. In mixture these chemicals are not useful, so the extract solution must be further processed to purify and concentrate these naturally occurring lignocellulosic-based components and compounds. Toward this objective, the aqueous extract is sundered (by centrifugation, filtration, solvent extraction, flocculation, evaporation, and/or membrane separation) to begin isolating sugars in a concentrated sugar stream, apart from the other hemicellulose and wood-derived compounds which are channeled into a "permeate" stream.

Then, along one sub-path of the process, the concentrated, long-chain sugars are hydrolyzed (cleaved) into monomer/dimer (short-chain) saccharides, i.e., simple sugars such as xylose and glucose. This hydrolysis may be accomplished using enzyme, acid, solid acid, and/or heat treatments followed by pH correction as necessary. During sugar hydrolysis, additional inhibitory components (e.g., acetic acid, methanol, etc.) are released or formed (e.g. furfural) as the long-chain sugars break apart into short-chain or single sugar molecules. At this stage the hydrolyzed sugar concentrate solution may or may not be diluted by a ratio of between 2:1 and 40:1. In either case the hydrolyzed sugar solution is then further processed to remove the newly released (during hydrolysis) inhibitors to produce a purified short-chain sugar solution sufficiently free of inhibitor compounds as to be readily fermentable.

Along the other extract solution sub-path, to separate and purify its constituent components, the isolated "permeate" solution is processed using standard chemical separation techniques including but not limited to solvent extraction, and/or distillation, and/or membrane separation, and/or pervaporation, and/or crystallization, and/or any combination of these. After separation and purification, the previously problematic fermentation inhibitors such as acetic acid, methanol, formic acid, furfural, and lignin become marketable, commercial platform chemicals.

B. Yield of Improved Woody and Other Fibrous Solids

According to another aspect of the invention, the technique of improving non-food, lignocellulosic components for manufacture of wood products can be carried out beginning with hot-water extraction involving the contacting of a charge of the non-food plant biomass material with water (with or without additional process enhancing compounds or materials), in a pressurized vessel at an elevated temperature up to about 250° C. to yield an aqueous extract containing hemicellulosic components, other wood-derived compounds, while leaving the lignocellulosic residue largely intact for use as a raw material for manufacturing significantly improved lignocellulosic products. The pressure vessel contents are discharged, and the improved lignocellulosic residue is separated from the aqueous extract.

Once separated from the extract liquor, the post-cook residue is in the form of a still largely intact cellulosic solid material significantly reduced in content of long-chain, non-cellulose, sugars and other hydrophilic components. The lignocellulosic material, with reduced hydrophilic components, is more chemically reactive, more resistant to absorption or adsorption (generally, sorption) of water, and possesses higher caloric value as measured by Btu content per unit of weight, and lower ash content (compared to unextracted biomass) as measured by combustion at 525° C. Given its increased chemical reactivity the improved extracted residue pulps and bleaches with greater speed and less material cost, and therefore constitutes an improved raw material for the manufacture of paper products (Amidon et al., 2008). Additionally, the improved lignocellulosic residue can be used to produce reduced-hydrophilic, traditional wood products such plastic wood composites (Pelaez-Samaniego, et al., 2013), fiberboard, or fuel pellets where resistance to water reduces product deterioration in high humidity environments. Resistance to deterioration of fuel pellets in high humidity environments is illustrated in side-by-side tests comparing fuel pellets manufactured from HWE improved lignocellulosic fiber against standard, commercial fuel pellets when placed in water. Replicated testing shows that standard wood fuel pellets manufactured from untreated woody biomass, when placed in room temperature tap water, begin to show signs of disintegration as early as one minute, and at five minutes are no longer recognizable as a fuel pellet. In contrast, fuel pellets manufactured from hot-water extracted woody biomass, when placed in room temperature tap water, remain intact after seven days and beyond. These tests serve as an another example of the improved degradation resistance of products manufactured from woody biomass that is reduced in hydrophilicity by contacting it with water in a pressure vessel at an elevated temperature up to about 250° C.

In addition to increased resistance to deterioration in humid environments, removal of low thermal value hemicellulosic materials via hot water extraction increases the caloric value of the residual lignocellulosic fiber. Independent laboratory tests show a minimum of 27% reduction in ash content and 2% increase in Btu content. Reduced ash content, increased BTU content, and increased moisture resistance combine to make the resulting fuel pellets an advanced, renewable, alternative heating fuel.

BRIEF DESCRIPTION OF THE DRAWING

The sole FIGURE of Drawing is a flow chart for explaining the process of this invention.

DETAILED DESCRIPTION OF THE DRAWING

The right-hand side of the sole Drawing FIGURE is a process flow chart for explaining the extraction process producing concentrates and permeates from which useful lignocellulosic-sugar feedstocks, and other lignocellulosic-derived compounds are separated and recovered.

The left side of the Drawing depicts a process flow through which the solid component of the extracted, lignocellulosic material, with reduced hydrophilicity, is forwarded for use as fuel, or for further manufacture into wood products, wood derivatives, or other useful lignocellulosic materials.

The generalized flow of the extraction process depicted in the Drawing can be described as follows.

The first step, Step 1, is the receiving and pre-processing of available non-food lignocellulosic feedstock [10], which may include, e.g., wood chips, straw, or any other plant matter. There is a gross screening process in which oversized materials (large chunks of wood) and contaminates (stones, soil, etc.) are selected and removed. This may include organic debris, detritus, as well as some lignocellulosic material. This is followed by a fine screening, in which undersized particles, or fines, including contaminates, such as sand, soil or the like, are separated and removed. This may also include organic debris, detritus, and lignocellulosic material. The remaining lignocellulosic material may be triturated (e.g., by chipping, tub grinding, hammer milling, or other available comminuting procedure) to reduce the feedstock to preferred size (comparable to commercial woodchips for pulping or smaller) and condition for further handling and processing. Magnetic screening and separation is applied at this time to remove any tramp metals that may be present in the lignocellulosic stream.

Then Step 2, a hot water extraction process [11] is applied to the prepared non-food lignocellulosic material, which is effective for a mass removal, most preferably between about ten percent and thirty-five percent. This may be done by batch processing, continuous processing, or semi-continuous processing. The hot water extraction process involves contacting the charge of prepared non-food lignocellulosic material with water (with or without small amounts of acetic acid, furfural, or other process enhancing compounds/materials), in a pressurized vessel, at an elevated temperature up to about 250° C. to yield an aqueous extract (or liquor) containing solubilized components of the lignocellulosic material. The residual non-food lignocellulosic material [12] (i.e., fibrous material) is separated from the liquor or extract [13], and each may be further processed as discussed below.

The separated aqueous extract [13] is processed in a series of stages to isolate and recover valuable hemicellulosic, and other lignocellulosic derived, compounds; this is shown on the right-hand branch of the Drawing.

A first-stage—Step 3—[14] involves filtration and separation, which may involve flocculation, and/or sedimentation, and/or centrifugation, and/or filtration, and/or hydrocyclone separation. Larger aromatic and oligomeric molecules separated from the aqueous extract at this point are recovered and stored for sale or future processing [15].

In the next stage—Step 4—[16], a concentrated, water-based solution of complex and simple saccharides [17] is created by further filtering the aqueous extract stream to remove non-sugar compounds, many of which are inhibitory to fermentation, into a permeate solution [18]. This partitioning/concentration [16] can be carried out via membrane separation, and/or evaporation, and/or solvent extraction, and/or by any combination of these processes.

Thereafter, the sugar concentrate [17] is subjected to Step 5, hydrolysis [19] via a process that may involve an enzyme treatment, and/or acid treatment, and/or heat, and/or solid acid, and/or any combination of these.

In the next stage—Step 6—[20], the acid hydrolyzed sugar solution may be pH-corrected (with an alkali or base) as necessary, before being further treated to isolate and recover commercially valuable chemicals [21 and 22]. This isolation and recovery step may collectively involve centrifugation, and/or membrane separation, and/or sedimentation, and/or filtration, which serve to remove aromatic products [21] from the hydrolyzed sugar solution. Step 7, comprised of further product separation [22] is necessary for final removal of inhibitory compounds, either by diafiltration using a single- or multi-stage membrane with countercurrent or non-counter-current flow, and/or solvent separation using selective chemical separation involving water-immiscible solvents. As output streams from the Step 7 product separation [22], the inhibitory chemical solution is then conveyed [24] to a recovery phase [18], while the remaining aqueous concentrate now consists mainly of fermentable, monomeric sugars [23] of the types mentioned above. There can be successive stages of hydrolysis, concentration, and separation to increase the yield of useful sugars from the feedstock. The pH correction shown at [20] may be conducted after the product recovery stages [21] and/or [22].

In the first Step 3 purification step [14], larger aromatic and oligomeric molecules are removed and recovered as products [15]. In subsequent purification steps [16, 19, 20, and 22], organic chemicals, such as acetic acid and other inhibitory compounds which have been solubilized in the aqueous extract, are separated so that the complex saccharides can be further hydrolyzed and purified to yield fermentable, short-chain sugars. The separated inhibitory materials [18 and 24] are combined, and processed as discussed next.

As shown at the right hand sub-branch, the permeate solution of inhibitory products isolated in previous steps, Step 4 and Step 7, [16 and 22] is processed in Step 8 [25] to separate and recover component commercial chemicals, e.g., acetic acid, formic acid, methanol, furfural, and water. This separation and recovery may be achieved by solvent extraction, and/or distillation, and/or membrane separation, and/or pervaporation, and/or crystallization, and/or any combination of these. The isolated compounds are available for commercial sale as platform chemicals [15 and 26].

Again referring to the Drawing, the initial steps [10] and [11], Steps 1 and 2, lead to two product streams: the previously discussed aqueous extract [13], as well as to the extracted lignocellulosic material [12]. The residual fibrous biomass material with the extracted materials removed [12], may be forwarded (Step 9) as raw material [30] for use as fuel, or for manufacture of wood products and/or wood derivatives. As previously described, the process begins with Step 1—the autocatalytic, hot-water separation of hemicellulosic compounds from the lignocellulosic biomass. The process generally includes the receiving and pre-processing of lignocellulosic material as described above [10], followed by Step 2—cooking the lignocellulosic material in hot water [11]. The liquor or aqueous extract [13] is removed from the cooked biomass solids [12]. The cooking process removes a significant portion (typically 23%) of the hydrophilic or water sorptive chemicals from the lignocellulosic material. The residual biomass solids are thus significantly less dense than the starting feedstock materials, and are also characterized by significantly reduced hydrophilicity (i.e., less attractive to water). Products made from this reduced hydrophilic material are less prone to water sorption from the environment, and thus will be less prone to softening from contact with water, and less prone to rot or deterioration. In addition, because this material equilibrates at very low water content and is relatively free from ash producing inorganic elements and hemicellulose compounds, it can serve as an increased BTU-content fuel in the form of chips or pellets [31]. These pellets burn hotter, with less ash residue and less propensity to form clinkers. In addition to fuel, other more valuable end-uses for the extracted lignocellulosic material are: pulp [32], wood composites [33], or as a bio-conversion feedstock [34].

DESCRIPTION OF THE PREFERRED EMBODIMENTS

In an embodiment of the process, the wood-yard supplies woodchip feedstock and handles oversized material, dust, and tramp metals. Screening and magnetic separation can be used for this preparatory phase. Favorably, storage for up to forty-five days worth of green wood will be available to maintain feedstock supply to the extraction operation. Self-dumping trucks deliver wood chips to the facility, and the wood is automatically handled by conveyor and/or mobile equipment (skid-steer, front loader, etc.).

In another embodiment, the extraction of lignocellulosic materials via water-based autohydrolysis removes from 10 percent up to 35 percent (typically 23%) of the mass of the lignocellulosic materials in a continuous, semi-continuous, or batch process operation. The lignocellulosic materials are contacted with water at an elevated temperature up to 250° C. to yield an aqueous extract and extracted, but largely intact, lignocellulosic materials.

A heated pressure vessel is used for extraction, and a two-stage washing system can be included to provide improved capture of extracted material. Chip feed and removal, in combination with liquid handling equipment are employed to fill and evacuate the pressure vessel. A heat exchanger is used to cool the extract or liquor, and to recover and recycle heat back to the hot water extraction pressure vessel. A holding tank stores the extract for downstream processing. A transfer pump and bag filter may be used to transfer and clean the extract in preparation for first-stage filtration.

In another embodiment following hot water extraction and coarse materials removal, first-stage filtration operates as a lignin and high molecular weight removal system for improving the efficiency of further extract solution downstream processing. During first-stage filtration, high molecular weight and suspended materials are dissociated from the extract solution by one or more of: sedimentation, centrifugation, filtration, hydro-cyclone, and/or flocculation. The cleaned extract solution from this step is cooled as necessary for the next processing stage.

In yet another embodiment following first-stage filtration, the next stage further refines the cleaned extract solution by separating monomeric and oligomeric sugars from inhibitory compounds such as acetic acid and furfural. This partitioning step can be accomplished by membrane separation, evaporation, and/or solvent extraction. The output products from this stage consist of a concentrated sugar solution (primarily oligomers with some monomers and dimers), and a solution containing inhibitory and other compounds. Both solutions will be further refined and/or transformed into commercial chemicals.

In a further embodiment, acid hydrolysis is performed on the concentrated sugar solution to break apart long-chain sugar polymers to monomeric or dimeric form by one or more of enzyme, acid, solid acid, and/or heat treatments. The addition of acid causes precipitation of residual aromatic materials and certain suspended solids from the concentrated sugar solution; these solids are later recovered. Then, application of heat to the hydrolysis process releases further materials into solution and suspension. Following hydrolysis these newly-released materials are removed and recovered from solution by centrifugation, filtration, membrane separation, and/or hydro-cyclone. The solution may then be pH-corrected as needed for further processing.

In still another embodiment following acid hydrolysis, additional fermentation inhibitors such as acetic acid and furfural released during hydrolysis must be removed from the sugar stream. This purification step may occur before or after pH correction, and is accomplished using single or multi-stage membrane separation, either with counter-current flow or non-counter current flow, and/or solvent separation (i.e., selective chemical separation with water immiscible solvents). In the case of the membrane separation, called diafiltration, two new streams are produced: a short-chain sugar solution containing xylose, mannose, arabinose, rhamnose, galactose, and glucose (5 and 6-carbon sugars), and a new permeate solution containing chemicals such as acetic acid, formic acid, furfural, and methanol. The sugar stream, now significantly reduced in content of inhibitory substances, may be converted by fermentation into such products as butanol, acetone, ethanol, et al. If pH correction has not been performed before separation of the inhibitory products, it will be performed before fermentation, and the target pH will be determined to satisfy desired conditions for the fermentation organism and corresponding end product.

In a yet further embodiment, chemicals in the permeate solution (acetic acid, methanol, formic acid, furfural) may be separated for commercial sale by solvent extraction, distillation, crystallization, membrane separation, and/or pervaporation.

In still another embodiment, water from both the sugar and permeate streams may be recovered by evaporation-condensation and/or membrane separation and/or steam stripping and/or air stripping.

In a still further embodiment, following hot water extraction, the residual lignocellulosic fiber may be manufactured into fuel pellets by comminuting the residual fiber to a size appropriate for extrusion through a pelletizer.

In another important embodiment, following hot water extraction, the improved residual lignocellulosic fiber may be manufactured into wood composites by comminuting the residual fiber to a size appropriate for mixing with adhesive additives to create structural or architectural members. The improved residual lignocellulosic fiber may be mixed with a plastic resin binder, e.g., recycled polyethylene or other material. These composite materials may then be used, for example, to manufacture into furniture products, or as structural members as building materials, as a plastic/wood composite decking, or for many other applications that may call for reconstituted wood products. Because of the significantly reduced hydrophilicity of the improved lignocellulosic fiber material, the structural material and products manufactured from it enjoy superior performance and longer useful life, especially in an outdoor environment.

In another embodiment, following hot water extraction, the improved residual lignocellulosic fiber may be manufactured into crystalline cellulose by de-lignifying the fiber using Kraft, sulfite, or organosolve pulping procedures, and then subjecting the de-lignified cellulose to acid hydrolysis or enzymolysis and/or sonication to produce a mixture of crystalline cellulose and predominately fermentable glucose.

While the invention has been described with reference to specific examples and embodiments, the invention is not to be limited to those embodiments, but the scope of the invention is to be ascertained from the appended claims.

What is claimed is:

1. Process of producing improved wood fiber for product uses from green non-food plant biomass, the process comprising:
   a) hot-water extraction carried out by contacting a charge of the green non-food plant biomass material with liquid water in the absence of any added reagents, in a pressurized vessel at an elevated temperature up to about 250° C., in which the hot-water extraction is adapted so as to yield an aqueous extract containing hemicellulosic components and an improved post-treatment lignocellulosic solid residue as residue material in which the hemicellulosic components thereof are substantially removed therefrom, but in which the cellulose and lignin components are substantially unchanged such that the post-treatment residue material retains its pre-treatment shape, size, and structural integrity;
   b) separating the aqueous extract from the lignocellulosic residue;
   c) further processing the separated aqueous extract; and
   d) processing the improved lignocellulosic residue while leaving the cellulose and lignin contents thereof substantially unchanged but in which a significant portion of the hemicellulosic components are absent to yield useful products with significantly reduced moisture reactivity.

2. The process of claim 1 wherein said step a) includes increasing the chemical reactivity of the lignocellulosic residue, reducing the content thereof of its hydrophilic components, reducing the ash content thereof, and increasing its BTU content per unit weight.

3. The process of claim 1, further comprising processing the residue of step d) to produce wood composite products suitable for use as structural materials said products belonging to a group that consists of chip board, flake-board, oriented-strand-board, fiber board, decking material, and cellulose-polymer mixtures.

4. The process of claim 1, further comprising processing the residue of step d) into lignocellulosic fuel pellets.

5. The process of claim 1 wherein the step a) of hot-water extraction is effective to unbind, separate, and remove between 10% to 35% of the mass of the charge of non-food plant biomass.

6. The process of claim 5 wherein the step a) is effective to remove substantially 23% of the mass of the charge of non-food plant biomass.

7. The process of claim 1 wherein said charge of green non-food plant biomass material consists of wood chips.

* * * * *